Figure 1:
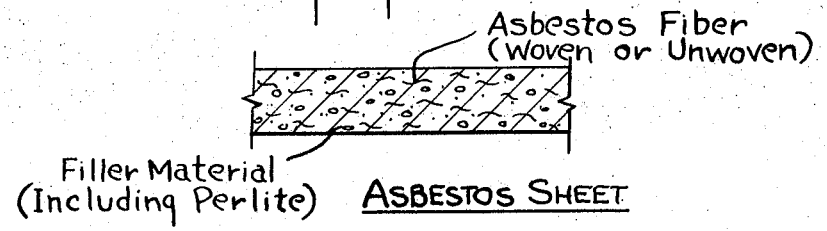

March 7, 1967 R. G. QUINN 3,307,969
FRICTION MATERIAL
Filed Feb. 21, 1963

Asbestos Fiber (Woven or Unwoven)
Filler Material (Including Perlite)
ASBESTOS SHEET

MULTI-PLY SHEET

BINDER SATURATED ASBESTOS SHEET

INVENTOR.
ROBERT G. QUINN
BY
John A. McKinney
ATTORNEY

United States Patent Office 3,307,969
Patented Mar. 7, 1967

3,307,969
FRICTION MATERIAL
Robert G. Quinn, Bound Brook, N.J., assignor to Johns-Manville Corporation, New York, N.Y., a corporation of New York
Filed Feb. 21, 1963, Ser. No. 260,290
20 Claims. (Cl. 117—126)

This invention relates to friction materials, and more particularly to improved compositions for friction materials and elements, and to novel and enhanced asbestos sheets for saturation in the manufacture of the same.

It is a primary object of this invention to provide a novel composition or material having a high and uniform coefficient of friction and low wear rate without a corresponding increased degree of wear on coacting metal surfaces such as brake drums; clutch plates, pressure plates and flywheels; or automatic transmission drums or steel spacer plates.

It is also a primary object of this invention to provide novel friction compositions of good frictional and wear properties which are not aggressively abrasive but exhibit reduced wear with a mild, optimum polishing effect upon metals of a degree to clean or remove by scouring and prevent the build-up on cooperating metal surfaces of the so-called heat "spotting" or checking surface effects of heat distress, and/or glaze or varnish films from the thermal decomposition or polymerization of oil, rubber, resins, etc.

It is also a primary object of this invention to provide novel friction compositions having good frictional wear properties and mild polishing characteristics and which possess a pronounced wicking effect without exhibiting the typical corresponding disadvantage or prohibitive attribute of sponginess or lack of dimensional stability whereby the compositions of this invention take up and retain oils or lubricating fluids and upon meeting a cooperating metal surface, as in contacting a wet clutch or transmission member, wipe the metal surface clean, giving complete and uniform contact therewith while retaining within their structure sufficient oil to prevent drying or a dry contact.

It is a further object of this invention to provide a new friction material and/or novel component therefor which exhibits or imparts the foregoing qualities, is more heat resistant than typical non-metallic friction elements, smoother and softer in shifting than all metal transmission plates, and effective and useful in friction products of a variety of compositions and/or constructions for either brake or transmission, both wet and dry, applications.

It is a still further object of this invention to provide enhanced asbestos sheet materials comprising paper and millboard for the manufacture of friction elements and improved resin saturated friction products thereof which have uniform and smooth, "alligator" or ripple-free surfaces of good dimensional integrity and resistance to compression, and a highly vesicular structure and high bulk with good resin saturation capacities.

These and other objects of this invention will become more apparent from the hereinafter detailed description.

Figure 2:
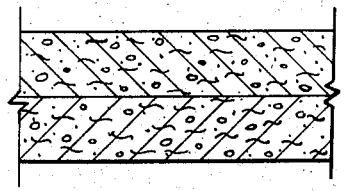
Figure 3:
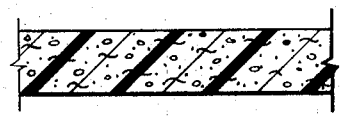

In the drawing:
FIG. 1 is a schematic fragmentary cross-sectional view of a porous asbestos sheet containing perlite and having a high capacity for binder saturant;
FIG. 2 is a view similar to FIG. 1 but of a multiply sheet product; and FIG. 3 is a view of the asbestos sheet of FIG. 1 but being binder saturated.

This invention comprises improved friction compositions and products thereof embodying effective amounts of a specific physical and chemical form of mineral perlite, viz., particles of an expanded perlite material comminuted or crushed to a relatively fine particle classification and in turn of a relatively high bulk density.

Perlite comprises a volcanic glass material having a typical composition of about 65–75% by weight of silica, 12–18% by weight of alumina, 7–10% by weight of alkali metal oxides, with small amounts of oxides of iron, calcium, and magnesium, and in its crude or raw state about 2–5% by weight of entrapped water. Due to its water content, perlite, when subjected to relatively high temperatures of about 1600 to 2000° F., undergoes a softening and rapid expansion or over-all distention forming a cellular particle or product of very low density, as for example down to about 2 lbs./cu. ft. Suitable means and details for the expansion of perlite and the characteristics of the material are set forth in United States Letters Patent No. 2,550,877 and No. 2,625,512. In its expanded cellular form, however, perlite comprises a wholly unsatisfactory component for friction materials. In addition to failing to favorably contribute to the basic or effective properties of friction materials, a significant property of expanded perlite is that its cellular body structure is subject to fracture and collapse upon the application of molding or friction contacting pressures whereupon a brake or transmission element embodying any appreciable amount of expanded perlite would undergo a loss of dimensional stability and the creation therein of voids resulting in a compressible or spongy, low density, and in turn ineffective friction product.

It has been found, nevertheless, that when its expanded particles are comminuted or the cellular structure thereof crushed and reduced to relatively fine particle sizes, perlite can be combined with or incorporated within typical friction compositions, materials, or products and that it imparts thereto, or effects therein a variety of properties which are of decided and appreciable advantages in their frictional performance including the new or enhanced qualities enumerated in the foregoing objects. Effective and normally suitable amounts of the comminuted expanded perlite for friction applications comprise approximately 5 to 40% by weight of the over-all friction composition with about 10 to 30% by weight thereof typically preferred.

Effective comminuted expanded perlite particle sizes for the practice of this invention average substantially all within the range of about 1 to 50 microns, preferably about 1 to 40 microns, and in turn a relatively high bulk density of at least about 4 lbs./cu. ft. up to about 15 to 30 lbs./cu. ft., and typically about 10 to 12 lbs./cu. ft. Typical and suitable commercial expanded perlite materials for the invention include those having the following essential characteristics of density and size classification:

| Density, lbs./cu. ft. | 12 | 12 | 25 |
|---|---|---|---|
| Particle size distribution: | | | |
| 40 microns | 0.5 | 4.1 | |
| 40–20 microns | 7.0 | 11.5 | |
| 20–10 microns | 35.2 | 38.4 | 1.8 |
| 10–8 microns | 15.7 | 14.0 | 4.7 |
| 8–6 microns | 17.4 | 14.0 | 14.5 |
| 6–4 microns | 13.4 | 9.4 | 31.3 |
| 4–2 microns | 6.0 | 3.9 | 33.3 |
| 2 microns | 4.5 | 4.7 | 14.4 |

The novel concept of this invention, the application of comminuted expanded perlite, applies to typical friction compositions, materials or products comprising asbestos fiber in one form or another in effective proportions as, for example, broadly of about 10% to 90% by weight, or more frequently about 20% to 70% by weight, and typically in many compositions within a range of about 30% to 60% by weight; and containing an organic binder exemplified by the relatively heat resistant or thermosetting resins and/or rubbers or elastomers in amounts which may range as great as 5% to 60% or more, but more commonly about 10% or 20% to 50% by weight, together with one or more filler materials of assorted compositions and characteristics employed in friction compositions. These friction products include elements or components for use either as brake linings, clutch facings, and transmission bands or discs, both wet and dry in operation, of a variety of constructions or structures including woven and felted linings and facings of impregnated asbestos and/or cotton cloth, semi-molded woven bodies, molded-type linings and facings including dry mix, sheeter formed, and those fabricated from millboard or paper.

In addition to the presence of asbestos fiber in woven or non-woven form, compositions of the foregoing type of friction products require a binder phase of one type or another to provide a strong, stable matrix which may be provided either initially in a pre-mix with the other components or subsequently impregnated into a prepared body. Binders currently preferred comprise the relatively heat resistant synthetic resins, particularly phenolic resins, and/or rubbers or elastomers, preferably the more heat resistant natural or synthetic rubbers such as butadiene-styrene copolymers (Buna GR-s), butadieneacrylonitrile copolymer (Buna N), polychloroprenes such as chlorobutadiene, or any other heat resistant vulcanizable or curable rubber which will not pass through an inversion or softening point during heat hardening cure, or in use. As is common, the rubber or elastomer phase may be fortified or stiffened with resins. Also, although possibly not providing optimum conditions in typical current installations, many of the older and now generally obsolete types of binders can be employed in the practice of this invention, as for example vegetable drying oils, in particular sulphurized drying oils such as linseed or tung oil, coal tar resins such as cresol resins, high melting point asphalts, natural gums, casein or starch products, etc., and combinations thereof. However, the thermal conditions obviously encountered in frictional applications due to dissipation of energy as heat in braking, and to a less but significant degree in clutch or transmission operations, render it clearly apparent that the particular material should cure to provide a substantially thermoset or non heat softening binder phase.

In addition to the essential comminuted expanded perlite and the basic asbestos fiber and binder phase, the friction products of this invention further encompass components comprising one or more of any of the well known and usual fillers including inert bodies, added to control or modify the coefficient of friction, or to otherwise more suitably adapt the friction material to its intended end use. Such fillers, including those affording some effect or simply inert masses, are employed in proportions ranging up to about 80% by weight of the composition and commonly in ranges of from about 5% or 10% up to 40, 50 or 60% by weight. Common friction material fillers include friction modifying agents, such as litharge, barytes, clays, zinc oxide, graphite, molybdenum disulfide, polymerization or heat treated products of cashew nut shell liquid, carbon black or lamp black, coke, etc.; metal particles or powder exemplified by lead, copper, brass, bronze, iron, etc.; hard refractory materials having a high coefficient of friction including feldspar, aluminum oxide, silicon dioxide, rutile titanium dioxide, iron barytes, zircon and the like; organic materials and fibers such as comminuted wood particles, assorted cellulose fibers, cotton linters, leather dust, etc.; and a number of other materials including, for example, mica, magnesium sulfate, magnesium oxide, sodium borate, calcium sulfate, barium chromate, red lead, iron oxide, diatomaceous earth or infusorial earth, rosin, gilsonite, blood albumen, etc.

While lending or imparting its unique attributes to friction components of a variety of compositions or constructions, comminuted expanded perlite has been found to be exceptionally adaptable to and useful in friction products manufactured or fabricated from asbestos sheets generally referred to as paper and including single-ply and multi-ply paper products such as millboard. This class of friction elements is typically constructed from a pre-formed sheet of apt thickness formed of a major portion of asbestos which is subsequently impregnated or saturated with a permanent binder phase consisting of a thermosetting resin and/or rubber in appropriate amounts of normally about 40–75% by weight of the base sheet. The base sheet, of course, must be of a nature as to take up and retain such relatively high amounts of resin and/or rubber saturant to provide an extensive strength imparting binder phase or matrix throughout the fibrous mass and result in a hard, dense or compression resistant and dimensionally stable body in addition to effecting good friction and wear characteristics. Impregnated asbestos base sheet friction products have found application as brake linings, clutch facings and transmission discs and bands for both dry and wet or oil immersion operation common in current automatic transmissions. Moreover, as will be more apparent from the examples, the qualities imparted through the incorporation of the comminuted expanded perlite in resin impregnated asbestos sheet elements directly contribute to the enhancement of this class of friction elements in each of the foregoing applications.

The following comprises specific illustrations or examples of some preferred and typical means of this invention and demonstrates the pronounced effects thereof. It is to be understood, however, that the specific materials and/or amounts thereof given are primarily exemplary and are not to be construed as limiting the invention to any particular material, amounts, compositions and/or data recited hereinafter.

*Example I*

An asbestos sheet, having the composition:

| | Percent |
|---|---|
| Asbestos fiber, 7D grade | 76 |
| Comminuted expanded perlite [1] | 20 |
| Lime | 2 |
| Corn gum (STAYCO, A. E. Staley Mfg. Co.) | 2 |

[1] A filter grade perlite having a particle size substantially between 1–40 microns and a density of 9.5 lbs./cu. ft.

was formed in a conventional manner on a cylinder mold paper machine in a thickness of 17–20 mils and width of 12 inches. The asbestos sheet was impregnated with an oil modified phenolic resin (DUREZ 17745 resin, 80% solids with a specific gravity of 0.960 at 75° F., Durez Plastics and Chemical, Inc.) by saturating 6×12 in. dimensioned samples, and by continuous saturating from a roll thereof.

The 6×12 in. paper samples, dried to a constant weight, were dipped in a bath of the oil modified phenolic and permitted to absorb resin for 3–5 minutes whereupon they were passed between wiper rollers and air-dried 24 hours. This was followed by a bake of 2 hours to 200° F., 1 hour to 300° F., ½ hour to 350° F., and 1 hour at 350° F., providing a dry, flexible product which was easily die cut. The amount of resin in the finished product was found to be 45% by weight thereof with the acetone extractable at 14±3%.

Other samples were prepared on a continuous saturator from a roll of the paper by passing the sheet through the resin bath diluted from its original 80% solids content down to 63% by weight with toluol to facilitate penetration. The dip period and in turn time for penetration of the resin into the paper was from 30 seconds to 1 minute whereupon the paper was then continuously passed between wiper bars and through a first tower at 200° F. and a second tower at 450° F. at a speed of 1 to 2 feet per minute. The resin content of the roll paper was found to be 40% by weight thereof with an acetone extraction thereof of 31±3%. Samples of each saturation technique were cut to an appropriate annular configuration for bonding to steel transmission discs with a resin adhesive and tested as follows.

Plain or ungrooved paper facings bonded to transmission discs were installed in a Buick "Dynaflow" transmission which in turn was coupled to an inertia machine. A single paper faced disc was used as a brake stopping the transmission flywheel with a 35.8 slug foot$^2$ inertia load rotating at 300 r.p.m., at a deceleration rate equivalent to 100 foot pounds of torque. The average coefficient of friction was calculated and plotted against the stop number with 1000 stops at 30-second intervals constituting a complete test. In addition to average friction, this test gives a good measure of wear because the work per stop was held constant. The test was repeated with like paper having grooved facings. The data produced by this test was as follows:

TABLE I.—INERTIA DYNAMOMETER OIL BRAKE TEST

|  | Ungrooved Sample | Grooved Sample |
| --- | --- | --- |
| Coefficient of friction: |  |  |
| High | 0.114 | 0.108 |
| Low | 0.094 | 0.094 |
| Average | 0.105 | 0.102 |
| Wear, average decrease in thickness | 0.0019 | 0.0071 |
| Final condition: |  |  |
| Friction disc | (1) | (1) |
| Steel plates | (2) | (3) |

[1] Good, smooth.
[2] Very light discoloration spots, very light lines.
[3] Very light lines, discolored spots.

The wear properties of these samples, as measured in average decrease in thickness, is significantly outstanding as is apparent when compared to comparable papers lacking the comminuted expanded perlite which, when tested in an identical manner, exhibited an average decrease in thickness of 0.0092 with ungrooved facings and 0.0180 with grooved facings.

A SAE dynamometer (Kelly machine) test to measure the coefficient of friction of the paper discs of Example I under closely controlled conditions of pressure, temperature, velocity, and mating steel plates finish, was carried out under the following conditions. The test was run at 200° F. oil temperature and 121 p.s.i. net lining pressure. A break-in for 100 minutes at 1000 r.p.m. was run prior to developing the following data for friction vs. r.p.m. from 1000 down to 0 r.p.m. The results were as follows:

TABLE II.—SAE DYNAMOMETER (KELLY MACHINE)

| Revolutions per minute: | Coefficient of friction |
| --- | --- |
| 1000 | 0.172 |
| 500 | 0.172 |
| 15 | 0.180 |

Next, a 1957 Lincoln automobile engine and transmission was used to cycle clutches employing the paper of Example I under actual operating conditions. Two test procedures were used; a moderate service test consisting of a wide open throttle 2–3 upshift every 45 seconds at 200° F. oil temperature and a severe service test consisting of a wide open throttle 2–3 upshift every 300 seconds at 275° F. oil temperature. Each test was run for 4000 cycles. The results were as follows:

TABLE III.—ENGINE CYCLING DYNAMOMETER

| | |
| --- | --- |
| Wear—average decrease in thickness | 0.0001. |
| Coefficient of friction | Good, no drop-off. |
| Final condition friction disc | Good, slightly darkened. |
| Steel disc | Good, slightly polished areas, blue tint. |

Finally, the paper of Example I was installed as facings for the transmission discs in a 1958 Mercury automobile to evaluate the shift feel characteristics. The car was driven in such a manner as to effect upshifts at various speeds, throttle openings, and temperatures. The general feel of all shifts was very acceptable, being smoother and softer than with full metallic discs employed in some transmissions.

Over-all conclusions based on the foregoing extensive and detailed evaluation of the paper friction material of Example I was that the material provided a good and adequate friction level with outstandingly improved wear characteristics for non-metallic disc facings, and provided substantially improved or "softer" action as compared to full metallic discs employed in some transmissions.

The compression resistance or dimensional stability of a friction element being a critical characteristic, the compression and recovery of the perlite containing asbestos paper of Example I was evaluated on a standard SAE–ASTM compressibility and recovery test machine for gasket materials. The employed procedure generally agrees with ASTM–D–1147–56T, i.e., the sample was centered on the anvil and a 5 pound preload applied and maintained 15 seconds with the preload thickness (P) being recorded. The major load was then applied in a slow uniform manner so that the total load was attained within 10 seconds. This total load was maintained for a period of 60 seconds at the end of which time the thickness (C) of the sample was again recorded. The major load was then immediately removed and after a period of 60 seconds the thickness of the original preload (R) was then recorded. Compressibility in percent was calculated as $$\frac{P-C}{C} \times 100$$

and recovery in percent was calculated as $$\frac{R-C}{P-C} \times 100$$

where P equals thickness under 5 pound preload in inches, M equals thickness under total load in inches, and R equals recovered thickness in inches. It was found that the paper of Example I, after bonding at 300 p.s.i., would compress approximately 0.0002 to 0.0003 inch under expected transmission pressures (200–400 p.s.i.). The results were as follows:

TABLE IV.—COMPRESSION DATA

| Gage Pressure | Applied Pressure, p.s.i. | Preload Thickness, Inches (P) | Compressed Thickness, Inches (C) | P−C | Percent Compressibility $\frac{P-C}{C} \times 100$ | Recovered Thickness (R) | R−C | Percent Recoverability $\frac{R-C}{P-C} \times 100$ |
|---|---|---|---|---|---|---|---|---|
| 25 | 200 | .0185 | .0182 | .0003 | 1.6 | .0183 | .0001 | 33 |
| 25 | 200 | .0174 | .0172 | .0002 | 1.1 | .0173 | .0001 | 50 |
| 25 | 200 | .0175 | .01735 | .00015 | 0.9 | .0174 | .00005 | 33 |
| 25 | 200 | .0186 | .01845 | .00015 | 0.8 | .0185 | .00005 | 20 |
| Mean | | | | .0002 | | | .00007 | 37.5 |
| 37.5 | 300 | .0188 | .0186 | .0002 | 1.06 | .01865 | .00005 | 25 |
| 37.5 | 300 | .0184 | .0182 | .0002 | 1.1 | .0183 | .0001 | 50 |
| 37.5 | 300 | .0188 | .0185 | .0003 | 1.6 | .0186 | .0001 | 33 |
| 37.5 | 300 | .01795 | .0177 | .00025 | 1.4 | .0178 | .0001 | 40 |
| 37.5 | 300 | .01940 | .01915 | .00025 | 1.3 | .01925 | .0001 | 28 |
| Mean | | | | .00024 | | | .00009 | 35.5 |
| 50 | 400 | .0185 | .01825 | .00025 | 1.35 | .01835 | .0001 | 40 |
| 50 | 400 | .01825 | .01800 | .00025 | 1.4 | .0181 | .0001 | 40 |
| 50 | 400 | .01980 | .01945 | .00035 | 1.8 | .0196 | .00015 | 43 |
| 50 | 400 | .01965 | .01830 | .00035 | 1.9 | .01845 | .00015 | 43 |
| Mean | | | | .00030 | | | .000125 | 41.6 |
| 125 | 1,000 | .01840 | .01725 | .00065 | 3.5 | .0181 | .00025 | 42 |
| 125 | 1,000 | .01885 | .01825 | .00060 | 3.3 | .01855 | .00030 | 50 |
| 125 | 1,000 | .01885 | .01815 | .00070 | 3.8 | .01855 | .00040 | 57 |
| 125 | 1,000 | .01880 | .01815 | .00065 | 3.5 | .01850 | .00035 | 54 |
| 125 | 1,000 | .02005 | .01935 | .00070 | 3.6 | .01975 | .00040 | 52 |
| Mean | | | | .00066 | | | .00034 | 51.6 |

The samples of the resin impregnated, comminuted expanded perlite containing asbestos papers of Example I were submitted to an independent automobile manufacturer for evaluation, and the reported comparative results were as follows:

TABLE V

| Composition | Coefficient of Friction | |
|---|---|---|
| | Static | Dynamic |
| Full metallic disc | 0.1120 | 0.0740 |
| Cellulose paper disc | 0.1427 | 0.1481 |
| Disc of Example I | 0.1606 | 0.1020 |

*Example II*

The relative frictional properties of several asbestos papers of like composition both with and without the comminuted expanded perlite additament were determined by preparing hand-sheets of papers of the following formulations in percent by weight, and upon saturating with phenolic resin ascertaining their respective coefficients of friction. The resin content and friction data of these papers are set forth in Table VI following.

*Example III*

Asbestos papers of the compositions given in Table VII were prepared and found to form satisfactory products. Of these, selected materials were subjected to extensive evaluation as set forth hereinafter.

TABLE VII

| Ingredients | Percent | | | | | | |
|---|---|---|---|---|---|---|---|
| | A | B | C | D | E | F | G |
| Asbestos | 75 | 68 | 68.5 | 69.5 | 75 | 72 | 75 |
| Perlite | 22 | 22 | 22 | 22.5 | 22 | 20 | 20 |
| Starch | 3 | 3 | 1.5 | | 3 | 3 | |
| Hydrated lime | | 2 | 2 | 2 | | | |
| Kraft waste pulp | | 5 | 6 | 6 | | | |
| Sulfite pulp | | | | | | 5 | 5 |

Samples of the foregoing paper compositions were saturated by submerging in a 58% solids oil modified phenolic resin solution and passed through a drying tower at the rate of 5 feet per minute. The first zone of the tower was set at 335° F., the second at 440° F., and the third at 520° F. The finished paper was dark brown and very uniform in appearance, and the resin was advanced into a "B" stage but not fully cured. The paper was then cut into appropriate 30 inch lengths and baked in an air-circulating oven for 2 hours to 350° F., and 2 hours at 350° F. Sheets of paper F and G were brush coated with two coats of 50% methyl ethyl ketone and 50% Cycleweld H2P cement (an acrylonitrile and phenolic resin product of Cycleweld Division of Chrysler Motor Corp.) solution by volume. After drying overnight the sheets were cut into facings 5.25 inches O.D.×3.98 inches I.D. and bonded to steel transmission plates. When tested, the paper of Formula F gave an average friction level of 0.095 to 0.0100, while the Formula G paper exhibited an average friction level of 0.085–0.090. Both materials

TABLE VI

| Constituents | A | B | C | D | E | F | G | H |
|---|---|---|---|---|---|---|---|---|
| Asbestos 7D, percent | 96 | 86 | 66 | | | | 76 | 76 |
| Asbestos 7D, clean, percent | | | | 76 | | | | |
| Asbestos 6D, clean, percent | | | | | 76 | | | |
| Asbestos 4T, clean, percent | | | | | | 76 | | |
| Starch, percent | 2 | 2 | 2 | 2 | 2 | 2 | 2 | 2 |
| Lime, percent | 2 | 2 | 2 | 2 | 2 | 2 | 2 | 2 |
| Perlite, percent | | 10 | 30 | 20 | 20 | 20 | 20 | 20 |
| Percent pickup of phenolic resin, oven dry weight | 55 | 58 | 54.5 | 76 | 71.5 | 60 | 72 | 64 |
| Coefficient of friction | 0.078 | 0.081 | 0.104 | 0.098 | 0.087 | 0.095 | 0.100 | 0.102 | exhibited wear values in the range of 0.001 to 0.003 inch for the 1000 cycle test.

Papers of Formulas F and G were further evaluated to determine their compressibility under various loadings, to determine the maximum operating pressures these materials could withstand. Pressures of 300, 600, 1000, 2000, 4000, and 6000 p.s.i. were used and the test procedure as in Example I followed ASTM–D–1147–56T. The paper of Formula F of nominal 30 mil thickness compressed approximately 0.0024 inch during the bonding cycle, whereupon it compressed an additional 0.001 inch per 1000 p.s.i. up to the 6000 p.s.i. maximum employed. This material also had approximately a 40% recovery within 60 seconds, for a net compression of 0.004 inch at 6000 p.s.i. The paper of Formula G with a nominal 15 mils thickness compressed approximately 0.001 inch during bonding. Subsequently this material compressed 0.0008 inch at 1000 p.s.i. loading and followed linearly up to 0.0024 inch compression at 6000 p.s.i., and had an approximately 40% recovery within 60 seconds for a net compression at 0.0014 inch of 6000 p.s.i.

*Example IV*

A multi-ply asbestos sheet produce or millboard consisting of 78% 7D asbestos fiber, 20% comminuted expanded perlite, and 2% starch was formed in a multi-cylinder paper making machine in a thickness of 0.311 inch an ddensity of 47.5 lbs. cu. ft. This product exhibited a resin pick-up of 39% by weight thereof. When cured, the resin saturated millboard provided an unusually hard brake lining element which was found to surpass conventional resin impregnated asbestos millboard brake lining in both frictional and wear properties.

*Example V*

A moldable friction composition formulated for wet or oil immersed transmission applications embodying the comminuted expanded perlite of this invention was prepared from the following:

| Ingredients | Percent Dry Weight | Batch |
|---|---|---|
| Polymerized cashew nut shell liquid (60% solids) | 1.9 | 11 lbs. |
| Naphtha | | 6 lbs. 8 oz. |
| Butadiene-acrylonitrile copolymer | 1.9 | 6 lbs. 8 oz. |
| Alcohol | | 36 lbs. |
| Phenol formaldehyde resin | 20.1 | 69 lbs. |
| Sulfur | 0.2 | 0 l's. 12 oz. |
| Carbon black | 0.7 | 2 lbs. 4 oz. |
| Friction particle (polymerized cashew nut shell liquid resin) | 6.7 | 23 lbs. |
| Copper powder | 30.3 | 104 lbs. |
| Asbestos fiber, grade 7F | 29.1 | 100 lbs. |
| Comminuted expanded perlite (15 lbs./cu. ft. density) | 9.1 | 31 lbs. 4 oz. |

When compared with transmission bands of similar conventional compositions but without the comminuted expanded perlite the following values were obtained:

TABLE VIII

| Torque (Frictional) | Composition of Example V | Conventional Compositions | | |
|---|---|---|---|---|
| High | 540 | 520 | 520 | 525 |
| Low | 475 | 450 | 435 | 475 |
| Average | 505 | 495 | 480 | 490 |

Further exemplary formulations illustrating a few of a various types of friction materials or compositions comprising comminuted expanded perlite (sized substantially between 1–40 microns and 12 p.c.f. density) in accordance with this invention:

*Example VI*

| | Percent by wt. |
|---|---|
| Asbestos fiber | 50 |
| Perlite | 25 |
| Rubber (crude) | 6 |
| Sulfur | 2 |
| Litharge | 2 |
| Zinc oxide | 3 |
| Carbon black | 3 |
| Barium sulphate | 9 |
| | 100 |

*Example VII*

| | |
|---|---|
| Heat polymerized vegetable (linseed) drying oil | 9 |
| Oil modified phenol formaldehyde resin | 9 |
| Lead formate | 8 |
| Potassium dichromate | 1 |
| Hard rubber friction particles | 6 |
| Sulfur | 2 |
| Perlite | 15 |
| Asbestos | 50 |
| | 100 |

*Example VIII*

| | |
|---|---|
| Short asbestos fiber | 45 |
| Barytes | 10 |
| Graphite | 3 |
| Gilsonite | 3 |
| Perlite | 15 |
| Phenol formaldehyde resin | 24 |
| | 100 |

*Example IX*

| | |
|---|---|
| Asbestos fiber | 20 |
| Phenolic resin binder | 15 |
| Perlite | 25 |
| Copper powder | 40 |
| | 100 |

*Example X*

| | |
|---|---|
| Short asbestos fiber | 55 |
| Thermosetting resin | 17 |
| Barytes | 5 |
| Hard rubber dust | 5 |
| Black iron oxide ($Fe_3O_4$) | 2 |
| Aluminum stearate | 1 |
| Perlite | 15 |
| | 100 |

As is apparent from the foregoing description, the friction compositions or materials of this invention which due to the inclusion of effective means of comminuted expanded perlite possess a number of unique and significantly advantageous properties including low wear, higher temperature resistance, wicking and polishing effects, and high coefficients of friction, among others, are particularly useful and effective in automatic transmissions with today's high torque engines with their stringent space limitations, and in the more compact braking systems of heavier automobiles of the current trend.

It will be understood that the foregoing details are given for the purpose of illustration and not restriction, and that this invention includes all modifications and equivalents which fall within the scope of the appended claims.

I claim:
1. Friction material composed of a hard, dense composition comprising asbestos fiber and organic binder, having distributed therethrough at least approximately 5% by weight thereof of comminuted expanded perlite sized substantially between about 1–50 microns and of a bulk density of about 4–30 lbs./cu. ft.

2. Friction material composed of a hard, dense composition comprising asbestos fiber and organic binder, having distributed therethrough approximately 5–40% by weight thereof of comminuted expanded perlite sized substantially between about 1–50 microns and of a bulk density of about 4–15 lbs./cu. ft.

3. Friction material composed of a hard, dense composition comprising approximately 10–90% by weight of asbestos fiber and approximately 5–60% by weight of organic binder, having distributed therethrough approximately 5–40% by weight of comminuted expanded perlite sized substantially between about 1–50 microns and of a bulk density of about 4–30 lbs./cu. ft.

4. Friction material composed of a hard, dense composition comprising approximately 10–90% by weight of asbestos fiber and approximately 5–60% by weight of organic binder, having distributed therethrough approximately 5–40% by weight of comminuted expanded perlite sized substantially between about 1–40 microns and of a bulk density of about 4–15 lbs./cu. ft.

5. Friction material composed of a hard, dense composition comprising approximately 10–90% by weight of asbestos fiber, approximately 5–60% by weight of organic binder, and filler material in amount up to approximately 80% by weight, having distributed therethrough approximately 5–40% by weight of comminuted expanded perlite sized substantially between about 1–50 microns and of a bulk density of about 4–30 lbs./cu. ft.

6. Friction material composed of a hard, dense composition comprising approximately 10–90% by weight of asbestos fiber, approximately 5–60% by weight of organic binder, and approximately 5–80% by weight of filler material, having distributed therethrough approximately 5–40% by weight of comminuted expanded perlite sized substantially between about 1–40 microns and of a bulk density of about 4–15 lbs./cu. ft.

7. Friction material composed of a hard, dense composition comprising approximately 20–70% by weight of asbestos fiber, approximately 10–50% by weight of organic binder, and approximately 5–60% by weight of filler material, having distributed therethrough approximately 10–30% by weight of comminuted expanded perlite sized substantially between about 1–40 microns and of a bulk density of about 4–15 lbs./cu. ft.

8. The friction material of claim 7 wherein the organic binder is selected from the class consisting of thermosetting synthetic resins and thermosetting curable elastomers and mixtures thereof.

9. Friction material composed of a hard, dense composition comprising approximately 30–60% by weight of asbestos fiber, approximately 20–50% by weight of thermosetting synthetic resin binder, and 0 to approximately 40% by weight of filler material, having distributed therethrough approximately 10–30% by weight of comminuted expanded perlite sized approximately 90% by weight between 1–40 microns and of a bulk density of about 10 lbs./cu. ft.

10. Friction material composed of a hard, dense composition comprising approximately 30–60% by weight of asbestos fiber, approximately 20–50% by weight of organic binder selected from the group consisting of thermosetting synthetic resins and thermosetting curable elastomers and mixtures thereof, 0 to approximately 20% by weight of organic friction modifying filler, and powdered metal filler in amount up to 30% by weight, having distributed therethrough approximately 10–30% by weight of comminuted expanded perlite sized approximately 90% by weight between 1–40 microns and of a bulk density of about 4–15 lbs./cu. ft.

11. Friction material comprised of a hard, dense body of resin saturated asbestos sheet, the asbestos sheet comprising asbestos fiber having distributed therethrough at least approximately 5% by weight thereof of comminuted expanded perlite sized substantially between about 1–50 microns and of a bulk density of about 4–30 lbs./cu. ft.

12. Friction material comprised of a hard, dense body of resin saturated asbestos sheet, the asbestos sheet comprising asbestos fiber having distributed therethrough at least approximately 5–40% by weight thereof of comminuted expanded perlite sized substantially between about 1–50 microns and of a bulk density of about 4–5 lbs./cu. ft.

13. Friction material comprised of a hard, dense body of resin saturated asbestos sheet, the asbestos sheet comprising approximately 20–90% by weight of asbestos fiber having distributed therethrough approximately 5–40% by weight of comminuted expanded perlite sized substantially between about 1–50 microns and of a bulk density of about 4–30 lbs./cu. ft., and containing resin impregnated throughout in amount of approximately 5–75% by weight.

14. Friction material comprised of a hard, dense body of resin saturated asbestos sheet, the asbestos sheet comprising approximately 30–80% by weight of asbestos fiber having distributed therethrough approximately 10–30% by weight of comminuted expanded perlite sized substantially between about 1–50 microns and a bulk density of about 4–15 lbs./cu. ft., and containing resin impregnated throughout in amount of approximately 10–60% by weight.

15. Friction material comprised of a resin saturated asbestos sheet, the asbestos sheet comprising approximately 30–60% by weight of asbestos fiber, and cellulose pulp in amount up to approximately 40% by weight, having distributed therethrough approximately 5–30% by weight of comminuted expanded perlite sized substantially between about 1–50 microns and of a bulk density of about 4–15 lbs./cu. ft., and containing thermosetting resin impregnated throughout in amount of approximately 30–60% by weight.

16. A porous asbestos sheet having a high capacity for resin saturant comprising approximately 30–90% by weight of asbestos fiber having distributed therethrough approximately 5–40% by weight of comminuted expanded perlite sized substantially between about 1–50 microns and of a bulk density of about 4–15 lbs./cu. ft.

17. A porous asbestos sheet having a high capacity for resin saturant comprising approximately 30–90% by weight of asbestos fiber, and cellulose pulp in amount up to approximately 40% by weight, having distributed therethrough approximately 10–30% by weight of comminuted expanded perlite sized substantially between about 1–40 microns and of a bulk density of about 4–15 lbs./cu. ft.

18. Friction material comprised of a resin saturated asbestos sheet, the asbestos sheet being a multi-ply body comprising approximately 30–90% by weight of asbestos fiber, and an organic binder in amount up to approximately 10% by weight, having distributed therethrough approximately 5–30% by weight of comminuted expanded perlite sized substantially between about 1–50 microns and of a bulk density of about 4–15 lbs./cu. ft., and containing thermosetting resin impregnated throughout in amount of approximately 5–65% by weight.

19. A porous asbestos multi-ply sheet product having a high capacity for resin saturant comprising approximately 30–90% by weight of asbestos fiber having distributed therethrough approximately 5–40% by weight of comminuted expanded perlite sized substantially between 1–50 microns and of a bulk density of about 4–15 lbs./cu. ft.

20. A porous asbestos multi-ply sheet product having a high capacity for resin saturant comprising approximately 30–90% by weight of asbestos fiber, and starch binder in amount up to approximately 10% by weight, having distributed therethrough approximately 10–30% by weight of comminuted expanded perlite sized substantially between about 1–50 microns and of a bulk density of about 4–15 lbs./cu. ft.

References Cited by the Examiner
UNITED STATES PATENTS

| | | | |
|---|---|---|---|
| 2,159,935 | 5/1939 | Sanders | 106—7.5 |
| 2,211,354 | 8/1940 | Spokes | 106—36 X |
| 2,402,474 | 6/1946 | Van Dyck et al. | 106—122 X |
| 2,600,812 | 6/1952 | Thomas | 106—84 |
| 2,626,864 | 1/1953 | Miscall et al. | 92—3 |
| 2,852,368 | 9/1958 | Steck et al. | 117—126 X |

ALFRED L. LEAVITT, *Primary Examiner.*

W. L. SOFFIAN, *Assistant Examiner.*

UNITED STATES PATENT OFFICE
CERTIFICATE OF CORRECTION

Patent No. 3,307,969                          March 7, 1967

Robert G. Quinn

It is hereby certified that error appears in the above numbered patent requiring correction and that the said Letters Patent should read as corrected below.

Column 6, line 7, for "300" read -- 30 --; column 12, line 11, for "4-5" read -- 4-15 --; column 9, line 29, for "an ddensity" read -- and density --; column 9, line 74, for "a" read -- the --.

Signed and sealed this 7th day of November 1967.

(SEAL)
Attest:

Edward M. Fletcher, Jr.
Attesting Officer

EDWARD J. BRENNER
Commissioner of Patents